(12) United States Patent
Lang et al.

(10) Patent No.: US 11,146,145 B2
(45) Date of Patent: Oct. 12, 2021

(54) ROTOR ASSEMBLY FOR AN ELECTRODYNAMIC MACHINE THAT MINIMIZES MECHANICAL STRESSES IN COOLING DUCTS

(71) Applicant: Siemens Industry, Inc., Alpharetta, GA (US)

(72) Inventors: Nicholas G. Lang, Cincinnati, OH (US); Ryan Edward Queen, Amelia, OH (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 154 days.

(21) Appl. No.: 16/553,702

(22) Filed: Aug. 28, 2019

(65) Prior Publication Data

US 2021/0067005 A1   Mar. 4, 2021

(51) Int. Cl.
| | |
|---|---|
| *H02K 9/14* | (2006.01) |
| *H02K 1/32* | (2006.01) |
| *H02K 17/16* | (2006.01) |
| *H02K 1/28* | (2006.01) |
| *H02K 5/04* | (2006.01) |
| *H02K 5/02* | (2006.01) |

(52) U.S. Cl.
CPC .............. *H02K 9/14* (2013.01); *H02K 1/28* (2013.01); *H02K 5/02* (2013.01); *H02K 5/04* (2013.01); *H02K 17/165* (2013.01)

(58) Field of Classification Search
CPC .. H02K 9/14; H02K 1/28; H02K 5/04; H02K 5/02; H02K 17/165; H02K 2213/03; H02K 1/32; H02K 17/205; H02K 17/00–17/44
See application file for complete search history.

(56) References Cited

U.S. PATENT DOCUMENTS

| | | | |
|---|---|---|---|
| 9,158,872 B2 | 10/2015 | Lang | |
| 2014/0070642 A1* | 3/2014 | Lang | ................ G06F 30/23 310/59 |
| 2017/0310171 A1 | 10/2017 | Reddy et al. | |

FOREIGN PATENT DOCUMENTS

| | | |
|---|---|---|
| CN | 206195574 U | 5/2017 |
| WO | 2018219390 A1 | 12/2018 |

* cited by examiner

*Primary Examiner* — Thomas Truong

(57) ABSTRACT

A rotor assembly for an electrodynamic machine is provided. The rotor assembly comprises a lamination section and an end connector. The lamination section comprises rotor lamination sheets formed to define an annular array of axial cooling ducts mechanically supported by a plurality of radial and arched structural members that define an array of arched or angled supports to readily pass a magnetic flux via an optimal flux path. The lamination section further comprises rotor slots, with rotor conductor bars being disposed in the rotor slots. The end connector is supported by the rotor conductor bars. An axial space is formed in the lamination section by the annular array of axial cooling ducts for guiding a cooling fluid flow in an axial direction through the rotor assembly.

20 Claims, 7 Drawing Sheets

ROTOR ASSEMBLY FOR AN ELECTRODYNAMIC MACHINE THAT MINIMIZES MECHANICAL STRESSES IN COOLING DUCTS

BACKGROUND

1. Field

Aspects of the present invention generally relate to a rotor assembly for an electrodynamic machine that minimizes mechanical stresses in cooling ducts.

2. Description of the Related Art

Electrodynamic machines typically generate a large amount of heat during operation. Excessive heat can damage internal components, limit the amount of power that can be provided by the machine, and/or adversely affect the longevity of the machine. Electrodynamic machines may have fans or radial and/or axial vents that can remove at least some heat from the machine by drawing cooling air through various passageways in the machine.

Air cooled or gas cooled induction machines, including induction motors and generators, typically employ axial vents for cooling purposes formed in a rotor assembly of the machine. The rotor assembly of an induction machine can be designed as a squirrel cage rotor, such as for example a fabricated copper squirrel cage rotor. The squirrel cage rotor may comprise rotor laminations including rotor conductor bars embedded in the laminations, wherein the axial vents are formed in the rotor laminations. The rotor conductor bars are connected, for example welded or brazed, to end connectors, also referred to short circuit rings. Squirrel cage rotors typically comprise one or more axial spaces between the rotor laminations (or a pressure plate) and the end connectors.

Commonly, rotors in electric machines include either annular array of trapezoidal cooling ducts or round cooling ducts. Trapezoidal vents, when optimized for magnetic behavior and airflow are adversely affected by the torque being transmitted, potentially inducing stress beyond the mechanical yield point of the laminated steel sheets. Round cooling ducts offer poor utilization of material for airflow or magnetic capability.

In prior systems, more material is required to keep the design within mechanical requirements. Prior systems will have heavier rotors with higher restriction to airflow.

Therefore, there is a need for lighter weight rotors in electric machines.

SUMMARY

Briefly described, aspects of the present invention relate to a rotor assembly for an electrodynamic machine. In electric machines, a rotor may include air ducts to provide cooling airflow to the electric machine. The air ducts may be integral to rotor lamination sheets and function as a part of the magnetic circuit, and as part of the rotor mechanical support structure. Lighter weight rotors may provide an advantage for machine mounting arrangement, bearing losses, and bearing support structure, and rotor dynamics. While maintaining a comparable magnetic saturation level, power factor, etc. more airflow is provided allowing for cooler running machines and/or machine size reduction.

In accordance with one illustrative embodiment of the present invention, a rotor assembly for an electrodynamic machine is provided. The rotor assembly comprises a lamination section and an end connector. The lamination section comprises rotor lamination sheets formed to define an annular array of axial cooling ducts mechanically supported by a plurality of radial and arched structural members that define an array of arched or angled supports to readily pass a magnetic flux via an optimal flux path. The lamination section further comprises rotor slots, with rotor conductor bars being disposed in the rotor slots. The end connector is supported by the rotor conductor bars. An axial space is formed in the lamination section by the annular array of axial cooling ducts for guiding a cooling fluid flow in an axial direction through the rotor assembly.

In accordance with one illustrative embodiment of the present invention, an electrodynamic machine is described. The electrodynamic machine comprises a rotor assembly, a stator assembly and a first end connector. The rotor assembly comprises a lamination section comprising rotor lamination sheets formed to define an annular array of axial cooling ducts mechanically supported by a plurality of radial and arched structural members that define an array of arched or angled supports to readily pass a magnetic flux via an optimal flux path. The lamination section comprises rotor slots, with rotor conductor bars being disposed in the rotor slots. The stator assembly defines an annular core receiving the rotor assembly. The rotor assembly rotates within the stator assembly based on electromagnetic fields generated by the stator assembly and the rotor assembly. The first end connector is supported by the rotor conductor bars. A first axial space is formed in the lamination section by the annular array of axial cooling ducts for guiding a cooling fluid flow in an axial direction through the rotor assembly.

DETAILED DESCRIPTION

Figure 1:
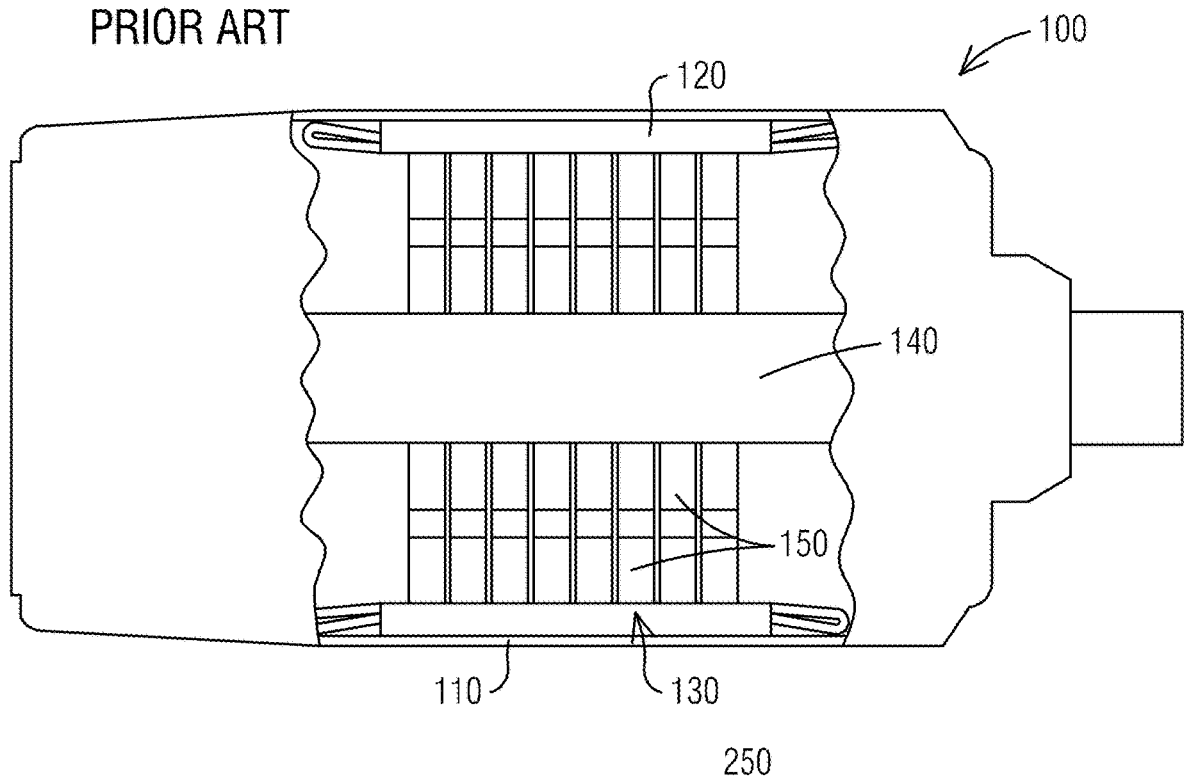
FIG. 1 illustrates schematically a cut away elevational view of a known induction machine.

To facilitate an understanding of embodiments, principles, and features of the present invention, they are explained hereinafter with reference to implementation in illustrative embodiments. In particular, they are described in the context of lighter weight rotors for use in electric machines. An annular array of axial cooling ducts mechanically supported by a plurality of radial and arched structural members are provided in a rotor assembly of an electrodynamic machine to minimize mechanical stresses in the cooling ducts. The plurality of radial and arched structural members define an array of arched or angled supports that readily pass a magnetic flux via an optimal flux path. The annular array of axial cooling ducts offers efficient utilization of material for airflow or magnetic capability. The annular array of axial cooling ducts doesn't induce stress beyond the mechanical yield point of the laminated steel sheets. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

These and other embodiments of lighter weight rotors according to the present disclosure are described below with reference to FIGS. 1-6 herein. Like reference numerals used in the drawings identify similar or identical elements throughout the several views. The drawings are not necessarily drawn to scale.

Consistent with one embodiment of the present invention, FIG. 1 represents a cut away elevational view of a known induction machine 100 which is modified by the present invention. The induction machine 100 can be an induction motor or an induction generator, in accordance with embodiments disclosed herein. The exemplary machine 100 is a totally enclosed fan cooled alternating current motor, it being understood that the present invention may be applied to other types of electrodynamic machines and electric motors that have a rotating mass. The machine 100 comprises a housing 110 and a stator 120 circumferentially oriented therein. The stator 120 forms a generally annular core into which is axially inserted a rotor assembly 130, which shall hereafter generally be referred to as a rotor. The rotor 130 has a shaft 140 onto which are affixed a stack of abutting rotor laminations 150. The rotor laminations 150, which are flat sheets of insulation coated ferromagnetic metal, e.g., pressed steel, are abutted to form the rotor core. For simplicity, motor components that are not deemed necessary for one skilled in the art to make and use the present invention are not included in the figures.

Figure 2:
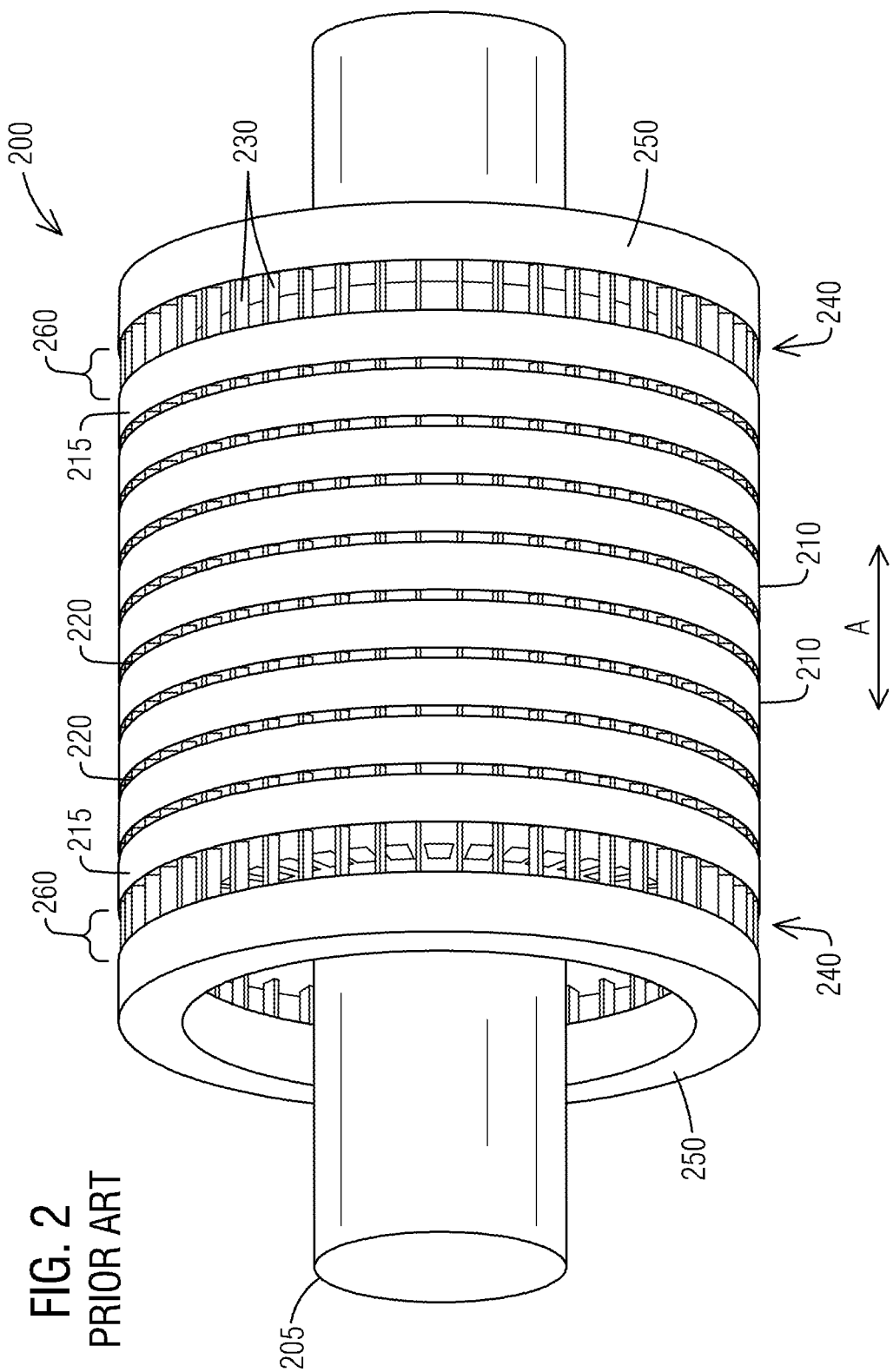
FIG. 2 illustrates a perspective view of a squirrel cage rotor of a known induction machine.

Referring to FIG. 2, it illustrates a perspective view of an example squirrel cage rotor assembly 200 of an induction machine in accordance with embodiments disclosed herein. The rotor assembly 200, hereafter generally referred to as squirrel cage rotor or simply rotor, may be used in an induction machine 100 as illustrated in FIG. 1. The rotor 200 may also be used in other suitable types of electric motors or machines.

The rotor 200 includes a plurality of stacked rotor lamination sections 210, wherein each lamination section 210 comprises one or more rotor laminations which may be laminated steel plates or sheets. Each rotor lamination has a central bore and is configured to be received over a rotor shaft 205. Each lamination is formed from a relatively thin piece of sheet metal that is punched, stamped or otherwise cut into shape and then consolidated with one or more adjacent and substantially similarly shaped and sized laminations to form the lamination sections 210. The consolidation is performed in accordance with various known methods. With enough laminations consolidated together, the laminations may form multiple lamination sections 210. The lamination sections 210 are arranged in an axial direction A on the rotor shaft 205, wherein gaps 220 formed between the lamination sections 210 provide radial vents for guiding cooling fluid, such as for example air or cooling gas, through the rotor 200 for cooling purposes.

Further, the rotor 200 includes a plurality of rotor conductor bars 230 radially distributed around the periphery of the lamination sections 210 and received through a respective plurality of outer periphery slots in the rotor laminations. The rotor conductor bars 230 define a pair of opposing bar end regions 240. The rotor 200 further includes end connectors 250, herein referred to as short circuit rings 250 on opposing axial ends, arranged within the bar end regions 240. The rotor conductor bars 230 and/or short circuit rings 250 may be made of, e.g., copper or aluminum. Other suitable conductive material(s) may alternatively be used for rotor conductor bars 230 and/or short circuit rings 250. The short circuit rings 250 are each supported by ends of the rotor conductor bars 230, wherein the rotor conductor bars 230 can be for example welded or brazed to the short circuit rings 250.

Figure 3:
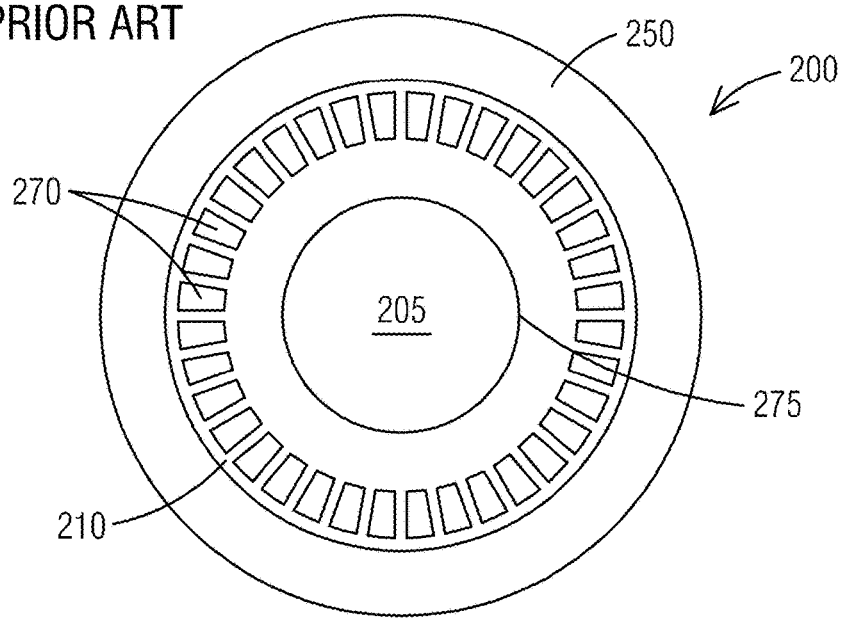
FIG. 3 illustrates a front view of a squirrel cage rotor of a known induction machine.

Turning now to FIG. 3, it illustrates a front view of the example squirrel cage rotor 200 as illustrated in FIG. 2. FIG. 3 illustrates one of the end connectors 250, the rotor shaft 205 and rotor lamination section 210 supported by the shaft 205. As described before, the rotor lamination section 210 comprises one or more rotor laminations, each lamination comprising a plurality of axial vents 270 and a plurality of slots. The slots are arranged about radial periphery and are each configured to receive there through a rotor conductor bar 230 of the rotor 200 (see FIG. 2). The axial vents 270 may be arranged in a ring around a central bore 275, which receives the shaft 205, and may be openings that pass axially through a plurality of stacked rotor laminations and lamination sections 210 to provide a passageway for cooling air and/or cooling gas to be received through the rotor 200.

Figure 4:
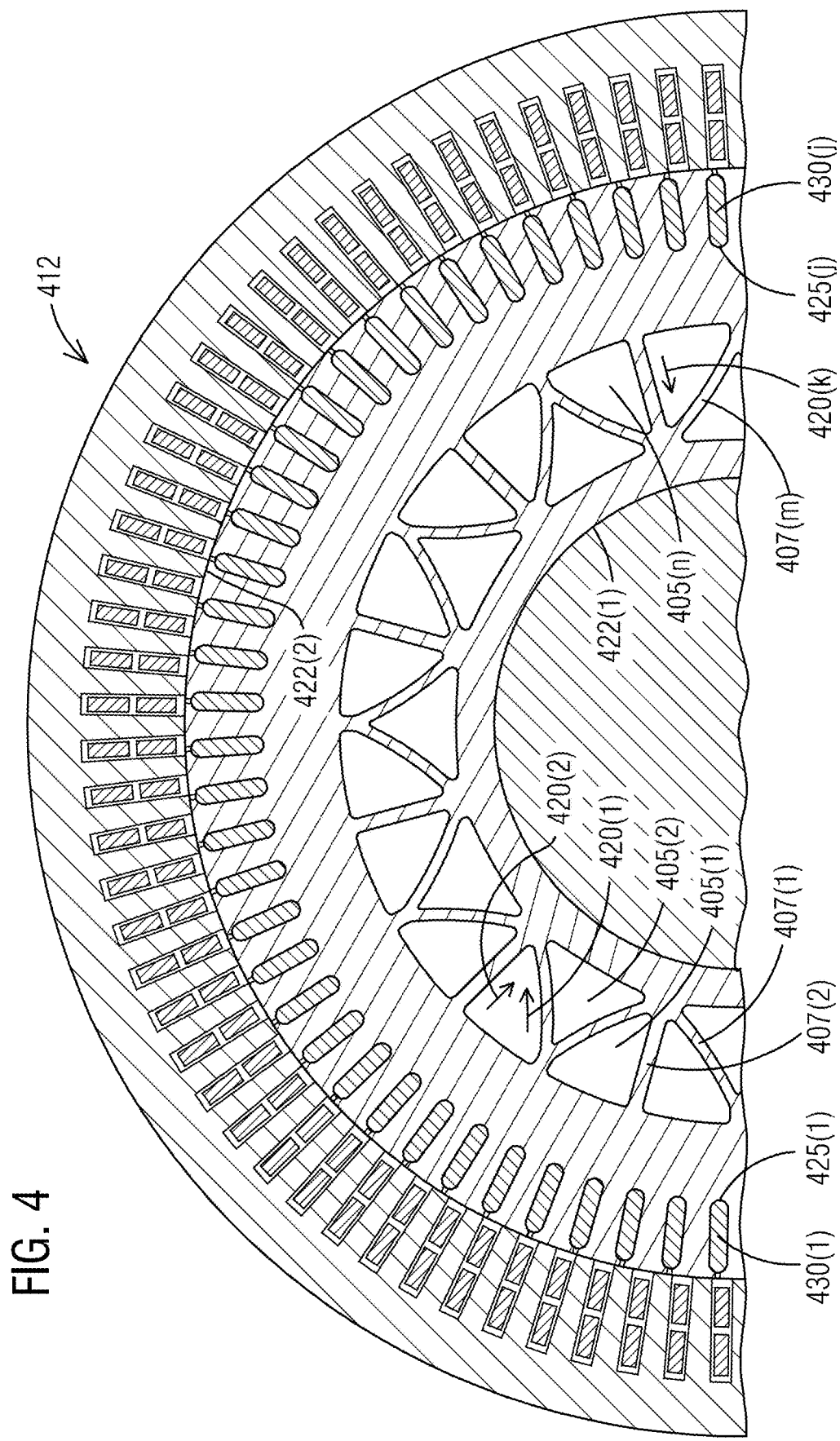
FIG. 4 illustrates a cross-sectional view of an annular array of axial cooling ducts mechanically supported by a plurality of radial and arched structural members for an induction machine in accordance with an exemplary embodiment of the present invention.

FIG. 4 illustrates a cross-sectional view (at line A-A' of FIG. 6) of an annular array of axial cooling ducts 405(1-$n$) mechanically supported by a plurality of radial and arched structural members 407(1-$m$) for an electrodynamic machine such as an induction machine 410 (seen in FIG. 6) in accordance with an exemplary embodiment of the present invention. Examples of the electrodynamic machine include an induction motor.

The annular array of axial cooling ducts 405(1-$n$) are provided in a rotor assembly 412 for the induction machine 410. The rotor assembly 412 comprises a lamination section 415 comprising rotor lamination sheets formed to define the annular array of axial cooling ducts 405(1-$n$) mechanically supported by the plurality of radial and arched structural members 407(1-$m$). The rotor assembly 412 is configured as a squirrel cage rotor for the induction machine 410.

The plurality of radial and arched structural members 407(1-$m$) define an array of arched or angled supports to readily pass a magnetic flux via an optimal flux path 420(1-$k$). The plurality of radial and arched structural members 407(1-$m$) bridge a gap between an inner ring 422(1) and an outer ring 422(2) of the rotor lamination sheets. The plurality of radial and arched structural members 407(1-$m$) include a plurality of radial structural members being extending perpendicular in a radial direction and a plurality of arched structural members being extending at about 45 degrees from the inner ring. The plurality of radial and arched structural members 407(1-*m*) provide a larger vent cross-section than trapezoidal or round cooling ducts and more mechanically robust for a given size.

The lamination section 415 further comprises rotor slots 425(1-*j*), with rotor conductor bars 430(1-*j*) being disposed in the rotor slots 425(1-*j*). The rotor assembly 412 comprises an end connector 435(1) (seen in FIG. 6) supported by the rotor conductor bars 430(1-*j*). An axial space 440(1) (seen in FIG. 6) is formed in the lamination section 415 by the annular array of axial cooling ducts 405(1-*n*) for guiding a cooling fluid flow in an axial direction A through the rotor assembly 412.

The annular array of axial cooling ducts comprises a mounting means (seen in FIG. 6) arranged at one of the two ends of the rotor assembly 412. The mounting means is mounted to an outer annular surface of the end connector 435(1).

The annular array of axial cooling ducts 405(1-*n*) is integral to the rotor lamination sheets and may be configured as a monolithic component. The annular array of axial cooling ducts 405(1-*n*) comprises metal. For example, the annular array of axial cooling ducts 405(1-*n*) comprises a highly permeable material such as electrical steel (esteel).

Figure 5:
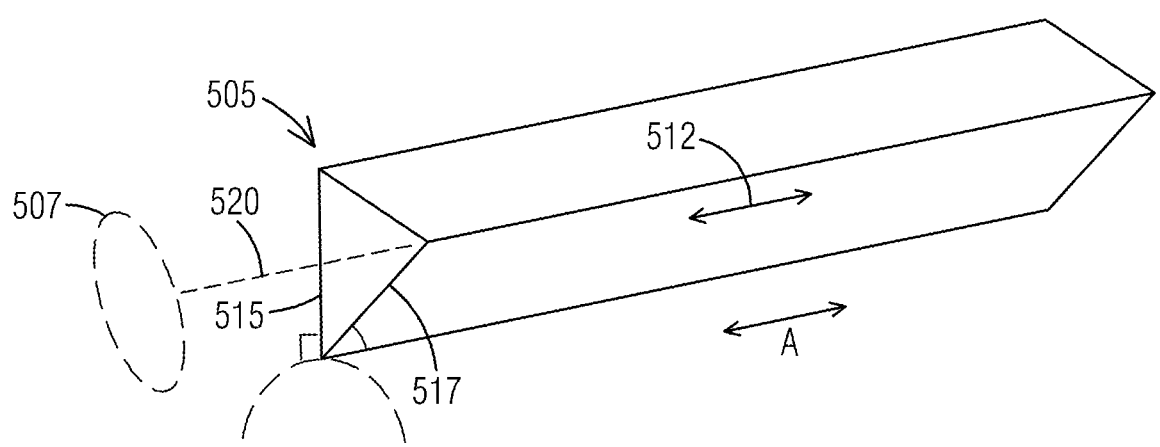
FIG. 5 illustrates a perspective view of an axial cooling duct in accordance with an exemplary embodiment of the present invention.

As seen in FIG. 5, it illustrates a perspective view of an axial cooling duct 505 in accordance with an exemplary embodiment of the present invention. The axial cooling duct 505 comprises a shape of a hollow channel 507 with a cylindrical section to provide an axial air passage way and a first plurality of radial and arched structural members 515 being perpendicular or a second plurality of radial and arched structural members 517 at an angle to a cylinder axis 520. The cylinder axis 520 is parallel to the axial direction A of the cooling fluid flow.

Figure 6:
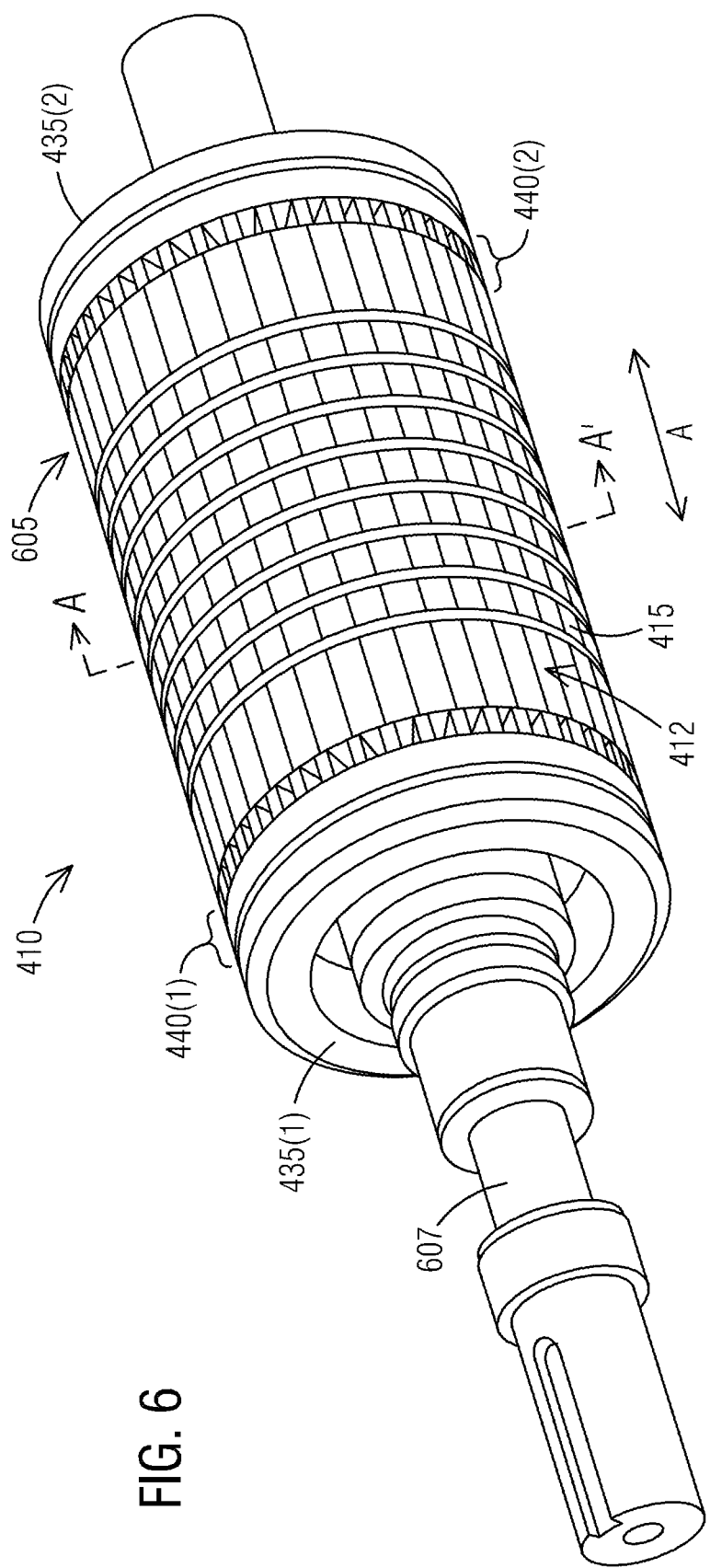
FIG. 6 illustrates a perspective view of a squirrel cage rotor of an induction machine including an annular array of axial cooling ducts in accordance with an exemplary embodiment of the present invention.

FIG. 6 illustrates a perspective view of a squirrel cage rotor 605 of the induction machine 410 including the annular array of axial cooling ducts 405(1-*n*) in accordance with an exemplary embodiment of the present invention. The induction machine 410 comprises a stator assembly 607 defining an annular core receiving the rotor assembly 412. The rotor assembly 412 rotates within the stator assembly 607 based on electromagnetic fields generated by the stator assembly 607 and the rotor assembly 412.

The induction machine 410 further comprises the first end connector 435(1) supported by the rotor conductor bars 430(1-*j*). A first axial space 440(1) is formed in the lamination section 415 by the annular array of axial cooling ducts 405(1-*n*) for guiding a cooling fluid flow in the axial direction A through the rotor assembly 412. The induction machine 410 further comprises a second end connector 435(2) supported by the rotor conductor bars 430(1-*j*). A second axial space 440(2) is formed in the lamination section 415 by the annular array of axial cooling ducts 405(1-*n*) for guiding the cooling fluid flow in the axial direction A through the rotor assembly 412.

Figure 7:
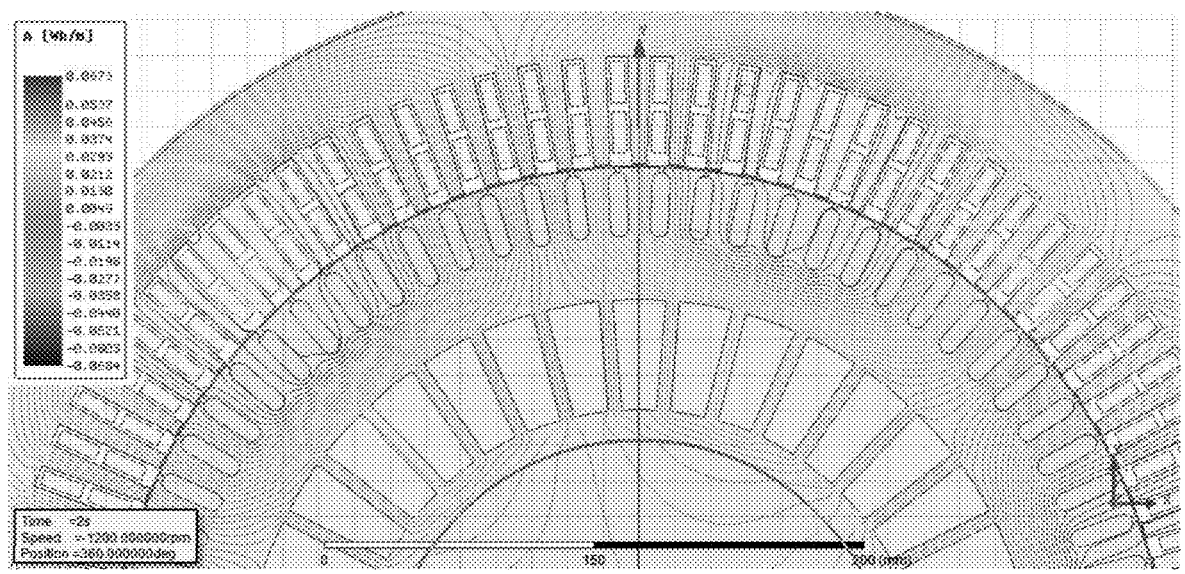
FIG. 7 illustrates a plot of field lines for a prior art design.
Figure 8:
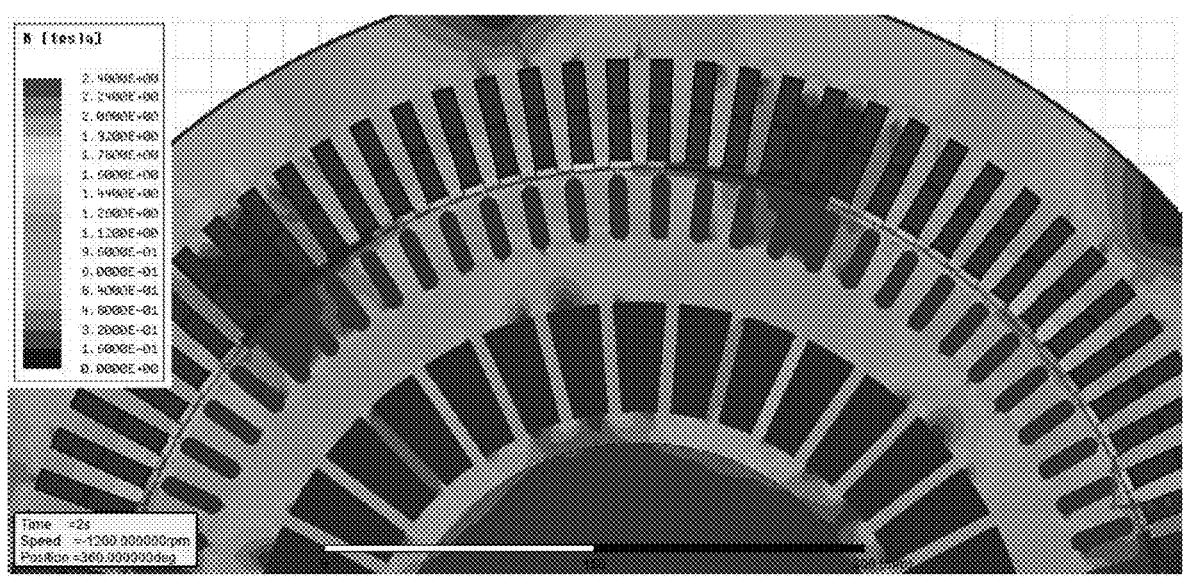
FIG. 8 illustrates a flux density plot for the prior art design of FIG. 7.

In FIG. 7, it illustrates a plot of field lines for a prior art design. With regard to FIG. 8, it illustrates a flux density plot for the prior art design of FIG. 7.

Figure 9:
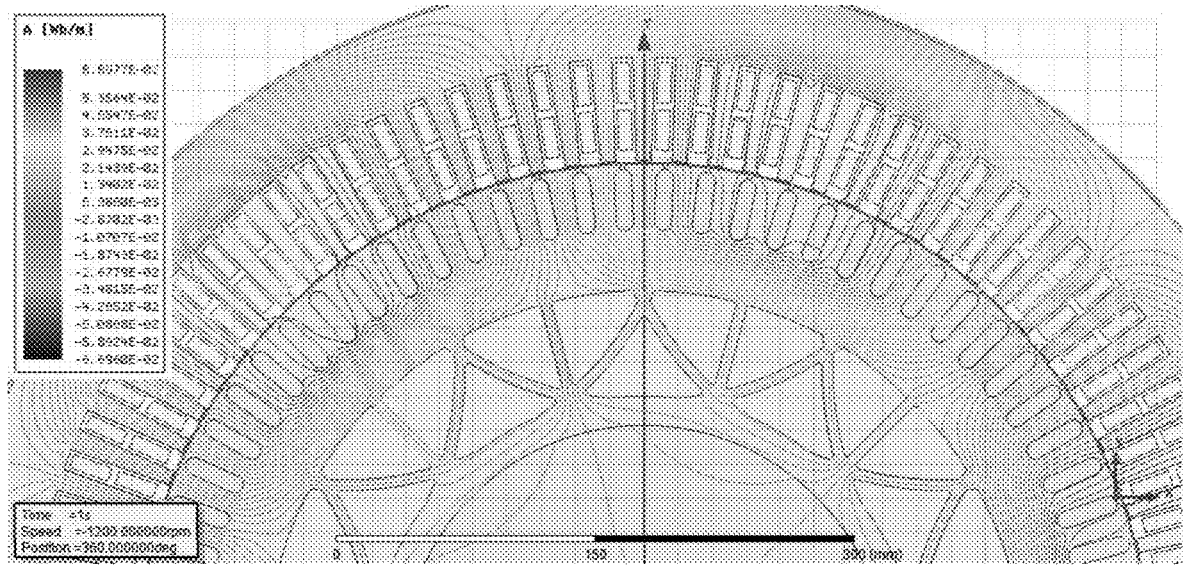
FIG. 9 illustrates a plot of field lines for an induction machine in accordance with an exemplary embodiment of the present invention.
Figure 10:
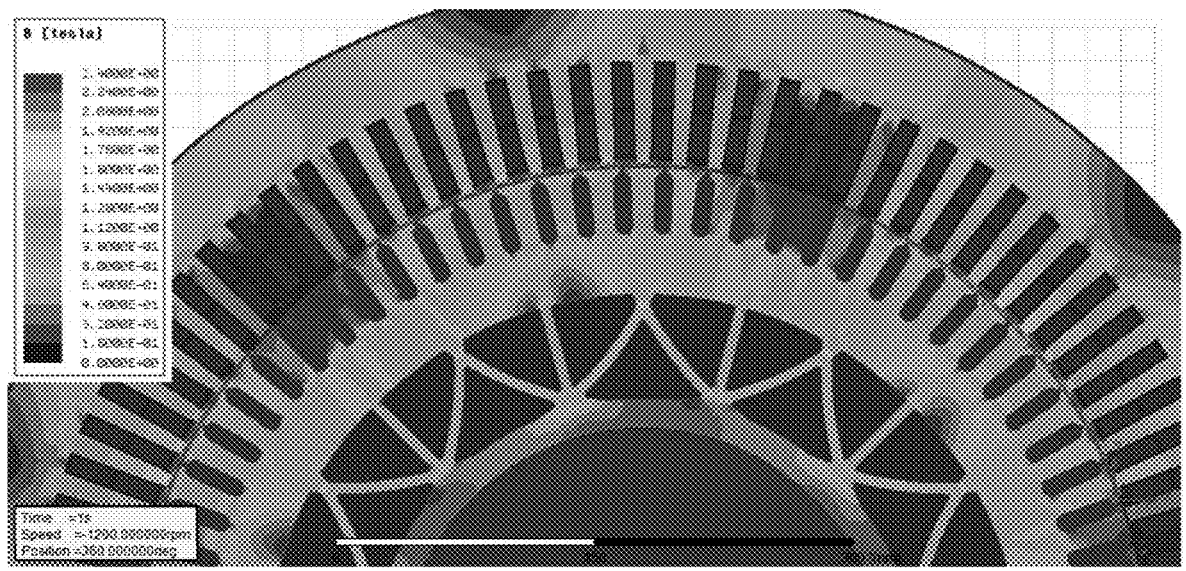
FIG. 10 illustrates a flux density plot for the induction machine of FIG. 9 in accordance with an exemplary embodiment of the present invention.

With respect to FIG. 9, it illustrates a plot of field lines for the induction machine 410 in accordance with an exemplary embodiment of the present invention. FIG. 10 illustrates a flux density plot for the induction machine 410 of FIG. 9 in accordance with an exemplary embodiment of the present invention. Flux distribution is more uniform in the induction machine 410 while seeing a 3% reduction in peak density and an increase in the area available for cooling flow, and lower mechanical stresses. The induction machine 410 will operate with improved power factor and lower temperature (or higher output power).

This invention also provides a method to iteratively improve motor performance, using a combination of tools, by alleviating a particular airflow restriction, maintaining proper levels of magnetic saturation, and reducing maximum mechanical stresses. In this case, mainly the rotor axial air passage way is modified. The cross-section of this passage way is commonly one of the most restrictive components in electric machines, in particular for those which employ a slender geometry (length to diameter ratio). This iterative process incorporates an analytical solver for machine performance, an electromagnetic finite element solver for evaluation of magnetization, and a numerical network solver for evaluation of resulting airflow, and a finite element solver to calculate mechanical stress. The iterative process is seeded with known values.

Secondarily, a solution is proposed for such an optimized design, comprising the annular array of axial cooling ducts 405(1-*n*) supported by radial and arched structural members 407(1-*m*). The additional arched structural member in the cooling ducts 405 allow for an optimal flux path which allows for the removal of additional active material (to make vent cross-section larger).

While radial and arched structural members are described here a range of one or more other structural means or other forms of structural members are also contemplated by the present invention. For example, other types of structural members may be implemented based on one or more features presented above without deviating from the spirit of the present invention.

The techniques described herein can be particularly useful for an annular array of axial cooling ducts. While particular embodiments are described in terms of the annular array of axial cooling ducts, the techniques described herein are not limited to such a structure but can also be used with other mechanical structures or configurations.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A rotor assembly for an electrodynamic machine, the rotor assembly comprising:
   a lamination section comprising:
      rotor lamination sheets formed to define an annular array of axial cooling ducts mechanically supported by a plurality of radial and arched structural members that define an array of arched or angled supports to readily pass a magnetic flux via an optimal flux path, and
      rotor slots, with rotor conductor bars being disposed in the rotor slots; and
   an end connector supported by the rotor conductor bars, wherein an axial space is formed in the lamination section by the annular array of axial cooling ducts for guiding a cooling fluid flow in an axial direction through the rotor assembly,
   wherein the plurality of radial and arched structural members include a plurality of radial structural members being extending perpendicular in a radial direction and a plurality of arched structural members being extending at about 45 degrees from the inner ring.

2. The rotor assembly as claimed in claim 1, wherein the annular array of axial cooling ducts comprises a shape of a hollow channel with a cylindrical section to provide an axial air passage way and the plurality of radial and arched structural members being perpendicular or at an angle to a cylinder axis, wherein the cylinder axis is parallel to the axial direction of the cooling fluid flow.

3. The rotor assembly as claimed in claim 1, wherein the electrodynamic machine is an induction motor.

4. The rotor assembly as claimed in claim 1, wherein the annular array of axial cooling ducts comprises metal.

5. The rotor assembly as claimed in claim 1, wherein the annular array of axial cooling ducts comprises a highly permeable material such as electrical steel (esteel).

6. The rotor assembly as claimed in claim 1, wherein the plurality of radial and arched structural members bridge a gap between an inner ring and an outer ring of the rotor lamination sheets.

7. The rotor assembly as claimed in claim 1, wherein the plurality of radial and arched structural members provide a larger vent cross-section than trapezoidal or round cooling ducts and more mechanically robust for a given size.

8. The rotor assembly as claimed in claim 1, wherein the annular array of axial cooling ducts is integral to the rotor lamination sheets and configured as a monolithic component.

9. The rotor assembly of claim 1, wherein the rotor assembly is configured as a squirrel cage rotor for an induction machine.

10. An electrodynamic machine comprising:
a rotor assembly comprising:
a lamination section comprising:
rotor lamination sheets formed to define an annular array of axial cooling ducts mechanically supported by a plurality of radial and arched structural members that define an array of arched or angled supports to readily pass a magnetic flux via an optimal flux path, and
rotor slots, with rotor conductor bars being disposed in the rotor slots; and
a stator assembly defining an annular core receiving the rotor assembly, the rotor assembly rotating within the stator assembly based on electromagnetic fields generated by the stator assembly and the rotor assembly;
a first end connector supported by the rotor conductor bars, wherein a first axial space is formed in the lamination section by the annular array of axial cooling ducts for guiding a cooling fluid flow in an axial direction through the rotor assembly,
wherein the plurality of radial and arched structural members include a plurality of radial structural members being extending perpendicular in a radial direction and a plurality of arched structural members being extending at about 45 degrees from the inner ring.

11. The electrodynamic machine of claim 10, further comprising:
a second end connector supported by the rotor conductor bars, wherein a second axial space is formed in the lamination section by the annular array of axial cooling ducts for guiding the cooling fluid flow in the axial direction through the rotor assembly.

12. The electrodynamic machine as claimed in claim 10, wherein the annular array of axial cooling ducts comprises a shape of a hollow channel with a cylindrical section to provide an axial air passage way and the plurality of radial and arched structural members being perpendicular or at an angle to a cylinder axis, wherein the cylinder axis is parallel to the axial direction of the cooling fluid flow.

13. The electrodynamic machine as claimed in claim 10, wherein the plurality of radial and arched structural members bridge a gap between an inner ring and an outer ring of the rotor lamination sheets.

14. The electrodynamic machine as claimed in claim 10, wherein the plurality of radial and arched structural members provide a larger vent cross-section than trapezoidal or round cooling ducts and more mechanically robust for a given size.

15. The electrodynamic machine as claimed in claim 10, wherein the annular array of axial cooling ducts comprises a highly permeable material such as electrical steel (esteel).

16. The electrodynamic machine of claim 10, wherein the rotor assembly is configured as a squirrel cage rotor for an induction machine.

17. A rotor assembly for an electrodynamic machine, the rotor assembly comprising:
a lamination section comprising:
rotor lamination sheets formed to define an annular array of axial cooling ducts mechanically supported by a plurality of radial and arched structural members that define an array of arched or angled supports to readily pass a magnetic flux via an optimal flux path, and
rotor slots, with rotor conductor bars being disposed in the rotor slots; and
an end connector supported by the rotor conductor bars, wherein an axial space is formed in the lamination section by the annular array of axial cooling ducts for guiding a cooling fluid flow in an axial direction through the rotor assembly,
wherein the plurality of radial and arched structural members include a plurality of radial structural members being extending perpendicular in a radial direction and a plurality of arched structural members being extending at an angle from the inner ring.

18. The rotor assembly as claimed in claim 17, wherein the plurality of arched structural members being extending at about 45 degrees from the inner ring.

19. The rotor assembly as claimed in claim 17, wherein the annular array of axial cooling ducts comprises a shape of a hollow channel with a cylindrical section to provide an axial air passage way and the plurality of radial and arched structural members being perpendicular or at an angle to a cylinder axis, wherein the cylinder axis is parallel to the axial direction of the cooling fluid flow.

20. The rotor assembly as claimed in claim 17, wherein the plurality of radial and arched structural members bridge a gap between an inner ring and an outer ring of the rotor lamination sheets.

* * * * *